(12) United States Patent
Prissok et al.

(10) Patent No.: US 11,161,956 B2
(45) Date of Patent: Nov. 2, 2021

(54) METHOD FOR PRODUCING PARTICLE FOAMS BASED ON THERMOPLASTIC ELASTOMERS, BY THERMAL BONDING USING MICROWAVES

(71) Applicant: BASF SE, Ludwigshafen (DE)

(72) Inventors: Frank Prissok, Lemfoerde (DE); Michael Harms, Diepholz (DE); Markus Schuette, Melle (DE)

(73) Assignee: BAFS SE, Ludwigshafen (DE)

( * ) Notice: Subject to any disclaimer, the term of this patent is extended or adjusted under 35 U.S.C. 154(b) by 340 days.

(21) Appl. No.: 15/557,543

(22) PCT Filed: Mar. 11, 2016

(86) PCT No.: PCT/EP2016/055339
§ 371 (c)(1),
(2) Date: Sep. 12, 2017

(87) PCT Pub. No.: WO2016/146537
PCT Pub. Date: Sep. 22, 2016

(65) Prior Publication Data
US 2018/0251621 A1   Sep. 6, 2018

(30) Foreign Application Priority Data

Mar. 13, 2015 (EP) ..................................... 15159048
Aug. 20, 2015 (EP) ..................................... 15181756

(51) Int. Cl.
| | |
|---|---|
| *C08J 9/232* | (2006.01) |
| *C08J 9/224* | (2006.01) |
| *B29C 44/34* | (2006.01) |
| *A43B 13/04* | (2006.01) |
| *B29C 35/08* | (2006.01) |
| *C08G 18/00* | (2006.01) |
| *B29K 75/00* | (2006.01) |
| *B29L 31/50* | (2006.01) |
| *B29L 31/00* | (2006.01) |
| *B29K 105/04* | (2006.01) |
| *B29K 105/00* | (2006.01) |

(52) U.S. Cl.
CPC .............. *C08J 9/232* (2013.01); *A43B 13/04* (2013.01); *B29C 35/0805* (2013.01); *B29C 44/3461* (2013.01); *C08G 18/00* (2013.01); *C08J 9/224* (2013.01); *B29C 2035/0855* (2013.01); *B29K 2075/00* (2013.01); *B29K 2105/04* (2013.01); *B29K 2105/251* (2013.01); *B29K 2995/0003* (2013.01); *B29K 2995/0063* (2013.01); *B29L 2031/504* (2013.01); *B29L 2031/712* (2013.01); *C08G 2110/005* (2021.01); *C08G 2110/0058* (2021.01); *C08G 2110/0066* (2021.01); *C08J 2201/034* (2013.01); *C08J 2201/036* (2013.01); *C08J 2205/052* (2013.01); *C08J 2205/06* (2013.01); *C08J 2207/00* (2013.01); *C08J 2300/22* (2013.01); *C08J 2300/26* (2013.01); *C08J 2375/04* (2013.01)

(58) Field of Classification Search
CPC .. C08J 9/232; C08J 9/16; C08G 18/00; B29C 35/08; B29C 22/00; B29C 47/92; B29C 44/56; B29C 47/00; B29C 44/00; B29C 44/34; B65D 65/38; B65D 81/36; B29D 35/122; A43B 13/04
See application file for complete search history.

(56) References Cited

U.S. PATENT DOCUMENTS

| | | | | |
|---|---|---|---|---|
| 3,640,787 | A * | 2/1972 | Heller | ..................... B29C 44/12 156/279 |
| 4,853,420 | A * | 8/1989 | Pham | ....................... C08J 9/232 521/50.5 |
| 6,358,459 | B1 | 3/2002 | Ziegler et al. | |
| 2010/0222442 | A1 | 9/2010 | Prissok et al. | |
| 2012/0329892 | A1 | 12/2012 | Prissok et al. | |
| 2014/0272379 | A1* | 9/2014 | Watkins | ............... A43B 13/125 428/316.6 |

FOREIGN PATENT DOCUMENTS

| | | | |
|---|---|---|---|
| DE | 10 2013 012 515 A1 | 3/2014 | |
| EP | 0 588 321 A1 | 3/1994 | |
| EP | 0588321 A1 * | 3/1994 | ......... B29C 44/3461 |
| EP | 0 705 682 A1 | 4/1996 | |
| EP | 1 016 354 A1 | 7/2000 | |
| EP | 1016354 * | 7/2000 | ............... A43B 7/28 |
| WO | 01/64414 A1 | 9/2001 | |
| WO | 2005/023920 A1 | 3/2005 | |

(Continued)

OTHER PUBLICATIONS

The data sheet of Tripropylene Glycol (TPG), accessed at https://monumentchemical.com/uploads/files/TDS/TPG%20-%20TDS.pdf (Year: 2018).*

(Continued)

*Primary Examiner* — Matthew J Daniels
*Assistant Examiner* — Shibin Liang
(74) *Attorney, Agent, or Firm* — Grüneberg and Myers PLLC

(57) ABSTRACT

A method for producing bead foams from foam beads based on thermoplastic elastomers, especially thermoplastic polyurethane, comprises foam beads being wetted with a polar liquid and joined together thermally in a mold via high-frequency electromagnetic radiation, especially microwave radiation, and also the bead foams obtainable therefrom.

5 Claims, No Drawings

(56) References Cited

FOREIGN PATENT DOCUMENTS

| WO | 2007/023091 A1 | 3/2007 |
| WO | 2007/082838 A1 | 7/2007 |
| WO | 2013/153190 A1 | 10/2013 |
| WO | 2014/198779 A1 | 12/2014 |

OTHER PUBLICATIONS

International Search Report dated May 31, 2016 in corresponding PCT/EP2016/055339 filed on Mar. 11, 2016 (with English translation of category of cited documents).
International Search Report dated May 31, 2016 in PCT/EP2016/55339 filed Mar. 11, 2016.

* cited by examiner

METHOD FOR PRODUCING PARTICLE FOAMS BASED ON THERMOPLASTIC ELASTOMERS, BY THERMAL BONDING USING MICROWAVES

The present invention relates to a method for producing bead foams by joining the foam beads together thermally via high-frequency electromagnetic radiation.

Bead foams, such as polypropylene or polystyrene bead foams, typically are fused together with superheated water vapor in automatic molding machines to form shaped parts for the packaging industry for example. TPU bead foams can be further processed not only by superheated steam fusion but also by in situ foaming or adhering with reactive polyurethane systems. Since superheated steam fusion has very high energy requirements, alternatives are sought. Fusion by means of hot air is possible in principle, but does not as yet yield satisfactory parts owing to unsatisfactory distribution, and requires long cycle times because of the low energy content of hot air and the poor thermal conduction of closed-cell foams.

In a currently widely practiced process for fabricating component parts, the pre-foamed beads are fused together thermally by means of water vapor. The previously foamed beads are sucked air-pneumatically out of a silo into the pressure fill unit of the molding machine, compressed with compressed air and blown into the mold. Since the beads do not contain any further blowing agent for foaming, they are transported into the mold in the compressed state (backpressure process). The individual beads are fused together using water vapor as heat transfer medium at a steaming pressure between 2.5 and 3.5 bar. After fusion, the molded part is cooled and the foam pressure sufficiently reduced for the molded part to be demolded. A description of the process for, for example, EPP beads is found in EP 0 588 321 A1.

Expanded thermoplastic polyurethane (E-TPU) is a very recent entrant for bead foams in that E-TPU can be fused together similarly to the above-described processes to form high-resilience component parts which, by virtue of the excellent adherence between the beads, can be exposed to extreme dynamic stresses. Foamed materials based on thermoplastic elastomers and their methods of making are known, for example, from WO 2005/023920, WO 2007/082838, WO 2013/153190 and WO 2014/198779.

WO 2007/023091 describes polystyrene foam beads having a polymer coating comprising waterglass and athermanous compounds such as graphite or carbon black, which are pressure sintered in the absence of water vapor to form shaped foam articles.

An alternative way of bonding the foam beads together thermally is by high-frequency fusion as described inter alia in WO 2001/64414. In high-frequency fusion, the foamed beads, in particular of expandable polystyrene (EPS), expanded polypropylene (EPP) or expandable polyethylene terephthalate (EPET) which are to be fused together are surrounded with a liquid medium absorbing electromagnetic radiation, water for example, and then joined together by applying a form of electromagnetic radiation such as, for example, microwaves. Owing to the water imbibition due to the higher polarity of thermoplastic polymers, this process is only marginally possible for foam beads comprising thermoplastic elastomers. In addition, the 100° C. temperature attainable on boiling water under atmospheric pressure is usually insufficient to fuse the elastomer beads together. The water imbibition allows the water to penetrate excessively into the beads, and the heating is effective not just at the points of contact but also within the beads. As a result, the beads may collapse prior to being fused.

DE 10 2013 012 515 A1 describes a process for joining foam beads, in particular EPP or EPS, together thermally by inductive heating with an improved energy balance. However, the production of shaped parts by inductive heating presupposes some electrical conductivity on the part of the beads, at least at the surfaces to be joined together. This is attainable by coating with electrically conductive fillers such as, for example, metallic powder or carbon black, nanotubes. Spraying is an example of a possible way to coat the beads.

The problem addressed by the present invention was that of remedying the disadvantages mentioned and of providing a method for producing bead foams by joining foam beads together thermally via high-frequency electromagnetic radiation, especially microwave radiation.

The problem was solved by a method for producing bead foams from foam beads based on thermoplastic elastomers, which comprises foam beads being wetted with a polar liquid and joined together thermally in a mold via high-frequency electromagnetic radiation.

Useful thermoplastic elastomers include, for example, thermoplastic polyurethanes (TPU), thermoplastic polyester elastomers (e.g., polyether esters and polyester esters), thermoplastic copolyamides (e.g., polyether copolyamides) or thermoplastic styrene-butadiene block copolymers. Foam beads based on thermoplastic polyurethane (TPU) are particularly preferred.

The foam beads are obtainable by impregnating thermoplastic elastomer pellets with a blowing agent in suspension, or by melt impregnation of molten thermoplastic elastomer with a blowing agent and subsequent pelletization. Suitable processes for producing the foam beads based on thermoplastic elastomers are described for example in WO 2005/023920, WO 2007/082838, WO 2013/153190 and WO 2014/198779.

The thermoplastic elastomers employed to produce the foam beads preferably have a Shore hardness in the range from 25A to 82D, preferably in the range from 30A to 80D and more preferably in the range from 65A to 96A, determined to DIN 53505.

The bulk density of the foam beads used is preferably in the range from 30 to 250 kg/m$^3$.

Even relatively minor proportions of the polar liquid used as microwave absorbers are generally sufficient for fusing by means of high-frequency electromagnetic radiation. The foam beads are generally wetted with the polar liquid in proportions of 0.1 to 10 wt %, preferably in proportions of 1 to 6 wt %, based on the foam beads used.

The polar liquid may be applied to the foam beads using customary coating techniques, such as spraying, dipping or wetting, with and without additional auxiliary materials. Customary mixers, spraying devices, dipping devices and/or drum apparatus may be employed for this purpose.

It is particularly preferable for the foam beads to be wetted with a polar liquid having an electric dipole moment in the range from 5 to 15*10$^{-30}$ Cm. The boiling point of the polar liquid is preferably in the range from 120 to 350° C., preferably in the range from 200 to 300° C. When the boiling point of the polar liquid is above the melting point of the thermoplastic beads of foam, the thermal joining together can take place at atmospheric pressure, in contradistinction to water vapor.

Examples of suitable polar liquids are microwave-absorbing hydrocarbons comprising polar groups. Possible polar groups include esters, amines or other heteroatom-bearing groups.

Preference for use as polar liquids is given to esters of carboxylic acids and diols or triols, for example glycol esters of acetic or citric acid, glycerol esters of acetic or citric acid or glycols and liquid polyglycols, such as triethylene glycol or tripropylene glycol.

It is particularly preferable for the foam beads to be wetted with 1,2,3-propanetriol triacetate (triacetin, glycerol triacetate), triethylene glycol or tripropylene glycol.

The foam beads may also have functional coatings, for example abrasion-resistant or low-melting polyurethane coatings. Useful further additives in the coating here include substances capable of absorbing thermal and/or IR radiation, such as boron nitrite and aluminum oxide, or electrically conductive carbons, such as graphite, which via the processes described are capable of delivering a closed network within an E-TPU component part. It is also possible to effect coloration with very small amounts of pigment in the coating without having to bulk color the foam beads.

It is further possible to apply various fibers (plastic, glass, metal) to the surface of the foam beads before fusion, to form their own network within the component parts after processing. This may provide improved mechanical properties.

It was found that, surprisingly, the method of the present invention provides precise thermal joining (fusing) of the foam beads from adequate microwave absorption and low energy input.

The thermal joining of the foam beads is effected in a mold via high-frequency electromagnetic radiation, especially via microwaves. High-frequency is to be understood as referring to electromagnetic radiation having frequencies of not less than 100 MHz. The electromagnetic radiation used is generally in the frequency range between 100 MHz and 300 GHz. Preference is given to using microwaves in the frequency range between 0.5 and 100 GHz, more preferably 0.8 to 10 GHz and irradiation times between 0.1 to 15 minutes. The frequency range of the microwave is preferably aligned with the absorption behavior of the polar liquid, or conversely the polar liquid is selected on the strength of its absorption behavior in relation to the frequency range of the microwave appliance used.

The method of the present invention makes it possible to fuse the foam beads together across a very wide frequency range. It is even in frequency ranges where water is not made to resonate that the coated foam beads heat up preferentially at the contact faces, so these fuse together before the entire beads heat up too much on the inside and collapse.

The present invention comprises the foam beads first being thinly wetted with the polar liquid, placed into a mold that does not absorb microwaves and then fused together via microwave.

The polar liquid is spread thinly across the surface of the E-TPU beads and quickly adheres thereto efficiently and homogeneously. On subsequent irradiation in the microwave, the fresh coating absorbs the energy almost exclusively, as a result of which the bead surface heats up in a precise manner and thereby very good intermelting with the adjacent beads is attained. The polar liquid subsequently dissolves in the thermoplastic elastomer beads like a plasticizer and does not have any adverse effect on the properties of the bead foam after fusion.

The polar liquid is readily imbibed by E-TPU by virtue of the polarity. In the course of the continued treatment/heating of the E-TPU beads, the plasticizer will (in contradistinction to PS and PP beads) penetrate into the E-TPU beads and so does not disrupt the adherence between the individual foam beads when they are joined together thermally to form bead foams.

The invention further provides bead foams obtainable by the above-described method of the invention. Their DIN 53504 elongation at break is preferably in the range from 50 to 800% and more preferably from 100 to 300%. The densities of the foam sheets, determined to DIN EN ISO 1183-1 A, are generally in the range from 100 to 400 g/l.

Applications for the bead foams of the present invention are conceivable in all markets where a particularly resilient yet lightweight material of construction is required, for example in protective packaging, i.e., the intelligent packaging of highly sensitive goods. However, they are also useful for sports floors and also for applications in automotive construction or mechanical engineering.

Owing to their elastomeric properties, the bead foams of the present invention are useful for applications in the sports, footwear and packaging sectors, for example as safety footwear or as packaging for electronic components or instruments.

EXAMPLES

Materials Used:
E-TPU Infinergy® 32-100 U10, expanded, predominantly closed-cell foam beads based on thermoplastic polyurethane, obtained by expansion of pelletized Elastollan® from BASF Polyurethanes GmbH under pressure and high temperature, bulk densities 110 g/l and 150 g/l.
Polar liquids: glycerol triacetate (triacetin, 1,2,3-propantriol triacetate)
triethylene glycol
tripropylene glycol
tri butyl acetylcitrate
Adhesive: Elastopave 6550/101 from BASF Polyurethanes GmbH, compact 2-component polyurethane system
Apparatus:
MLS-Ethos plus laboratory microwave system having a maximum power output of 2.5 kW.
Methods of Measurement:
Bulk density was determined by filling a 200 ml vessel with the expanded beads and determining the weight by weighing. An accuracy of ±5 g/l may be assumed here.

The densities of the foam sheets were determined to DIN EN ISO 1183-1 A.

The compressive strength of the foam sheets was measured in accordance with DIN EN ISO 3386 at 10%, 25%, 50% and 75% compression.

Compression set was determined for the foam sheets (shoe foam) after conditioning (6h/50° C./50%) to ASTM D395.

The rebound resilience of the foam sheets was determined to DIN 53512.

Elongation at break and tensile strength were determined to DIN 53504.

Example B1

45 parts by weight of the E-TPU foam beads having a bulk density of 110 g/l were placed in a vessel together with 2.4 parts by weight of glycerol triacetate. The vessel was shaken to completely wet the E-TPU foam particles with glycerol triacetate in the course of 60 seconds.

47.4 grams of the wetted and still loose individual beads were filled into a microwaveable mold measuring 200 mm×200 mm×10 mm. A height-adjustable lid exerted slight pressure on the beads. This filled mold was placed aslant at a 30° angle on the outer edge of the laboratory microwave turntable and irradiated at 400 watts for 40 seconds, the mold was turned 180° about its vertical axis and irradiated at 400 W for a further 40 seconds, then the mold was turned about its vertical axis by a further 90° and then irradiated horizontally at 400 W for a further 40 seconds. The mold was removed from the microwave and cooled down to room temperature in a water bath. A fused-together sheet of foam could then be removed.

Example B2

55 parts by weight of the E-TPU foam beads having a bulk density of 130 g/l were placed in a vessel together with 2.8 parts by weight of glycerol triacetate. The vessel was shaken to completely wet the E-TPU foam beads with glycerol triacetate in the course of 60 seconds.

57.8 grams of the wetted and still loose individual beads were filled into a microwaveable mold measuring 200 mm×200 mm×10 mm. A height-adjustable lid exerted slight pressure on the beads. This filled mold was placed aslant at a 30° angle on the outer edge of the laboratory microwave turntable and irradiated at 400 watts for 45 seconds, the mold was turned 180° about its vertical axis and irradiated at 400 W for a further 45 seconds, then the mold was turned about its vertical axis by a further 90° and then irradiated horizontally at 400 W for a further 45 seconds. The mold was removed from the microwave and cooled down to room temperature in a water bath. A fused-together sheet of foam could then be removed.

Example B3

55 parts by weight of the E-TPU foam beads having a bulk density of 130 g/l were placed in a vessel together with 2.8 parts by weight of triethylene glycol. The vessel was shaken to completely wet the E-TPU foam beads with triethylene glycol in the course of 60 seconds.

57.8 grams of the wetted and still loose individual beads were filled into a microwaveable mold measuring 200 mm×200 mm×10 mm. A height-adjustable lid exerted slight pressure on the beads. This filled mold was placed aslant at a 30° angle on the outer edge of the laboratory microwave turntable and irradiated at 400 watts for 40 seconds, the mold was turned 180° about its vertical axis and irradiated at 400 W for a further 40 seconds, then the mold was turned about its vertical axis by a further 90° and then irradiated horizontally at 400 W for a further 40 seconds. The mold was removed from the microwave and cooled down to room temperature in a water bath. A fused-together sheet of foam could then be removed.

Example B4

55 parts by weight of the E-TPU foam beads having a bulk density of 130 g/l were placed in a vessel together with 2.8 parts by weight of tributyl acetylcitrate. The vessel was shaken to completely wet the E-TPU foam beads with tributyl acetylcitrate in the course of 60 seconds.

57.8 grams of the wetted and still loose individual beads were filled into a microwaveable mold measuring 200 mm×200 mm×10 mm. A height-adjustable lid exerted slight pressure on the beads. This filled mold was placed aslant at a 30° angle on the outer edge of the laboratory microwave turntable and irradiated at 400 watts for 45 seconds, the mold was turned 180° about its vertical axis and irradiated at 400 W for a further 45 seconds, then the mold was turned about its vertical axis by a further 90° and then irradiated horizontally at 400 W for a further 45 seconds. The mold was removed from the microwave and cooled down to room temperature in a water bath. A fused-together sheet of foam could then be removed.

Comparative Test V1:

60 g of uncoated E-TPU foam beads having a density of 110 g/l were fused together using water vapor to form shaped foam articles.

Comparative Test V2:

60 g of uncoated E-TPU foam beads having a density of 110 g/l were fused together using 9 wt % of an adhesive to form shaped articles of foam.

Comparative Test V3:

60 g of uncoated E-TPU foam beads having a density of 110 g/l were fused together using 23 wt % of an adhesive to form shaped articles of foam.

The properties of the foam sheets from Examples B1-B4 and Comparative Tests V1-V3 are summarized in table 1.

The foam sheets from Examples B1 to B4 exhibit a higher rebound resilience versus the adhered foam sheets from Comparative Tests V2 and V3.

It is further advantageous that the microwave fusion (Examples B1) allows lower component part weights than are possible by water vapor fusion (Comparative Test V1). An increase in the rebound resilience and a reduction in density are considered advantageous.

Also of particular advantage is the high elongation at break for the foam sheets of Examples B2 and B3 versus the foam sheets fused together in standard fashion with water vapor (Comparative Test V1) and the adhered foam sheets (V2 and V3).

Particularly the combination of low density, high tensile strength and elongation at break and also high rebound resilience is desirable in order to obtain lightweight component parts having good mechanical properties.

TABLE 1

Properties of foam sheets from Examples B1-B4 and Comparative Tests V1-V3

|  | B1 | B2 | B3 | B4 | V1 | V2 | V3 |
|---|---|---|---|---|---|---|---|
| Compressive strength 10% [kPa] | 8.3 | 9.6 | 3.4 | 3.9 | 78 | 20.3 | 26.8 |
| Compressive strength 25% [kPa] | 44.4 | 51.7 | 22.6 | 24.5 | 170 | 53 | 60.3 |
| Compressive strength 50% [kPa] | 157.3 | 261.7 | 139.7 | 138.0 | 366.7 | 142 | 156.9 |
| Compressive strength 75% [kPa] | 814 | 2439 | 1127 | 1183 | 1822 | 540.3 | 669.5 |
| Density [g/l] | 189 | 265 | 301 | 299 | 253.5 | 135 | 152 |
| Rebound resilience [%] | 58 | 59 | 56 | 57 | 70 | 55 | 55 |
| Tensile strength [kPa] | 313 | 599 | 561 | 499 | 1168 | 120 | 292 |
| Elongation at break [%] | 124 | 189 | 183 | 185 | 108 | 32 | 42 |

We claim:

1. A method for producing bead foams, the method comprising
   wetting foam beads with a polar liquid that has a boiling point in the range from 120° C. to 350° C., and
   joining the foam beads together thermally in a mold via high-frequency electromagnetic radiation,
   wherein the foam beads are obtained from at least one thermoplastic polyurethane elastomer and a blowing agent; and
   wherein said polar liquid comprises a glycol ester of acetic acid, a glycol ester of citric acid, a glycerol ester of acetic acid, a glycerol ester of citric acid, triethylene glycol tripropylene glycol or a mixture thereof.

2. The method according to claim 1, wherein the foam beads are joined together thermally via microwaves in the frequency range between 100 MHz and 300 GHz.

3. The method according to claim 1, wherein the foam beads have a bulk density in the range from 30 to 250 kg/m$^3$.

4. The method according to claim 1, wherein the foam beads are wetted with the polar liquid in proportions of 0.1 to 10 wt %, based on the foam beads.

5. The method according to claim 1, wherein the polar liquid comprises 1,2,3-propanetriol triacetate, triethylene glycol, tripropylene glycol, or a mixture thereof.

* * * * *